March 26, 1968  A. VOGT  3,374,687
TRANSMISSION FOR HELICOPTER ROTOR SHAFTS
Filed March 7, 1966  2 Sheets-Sheet 2
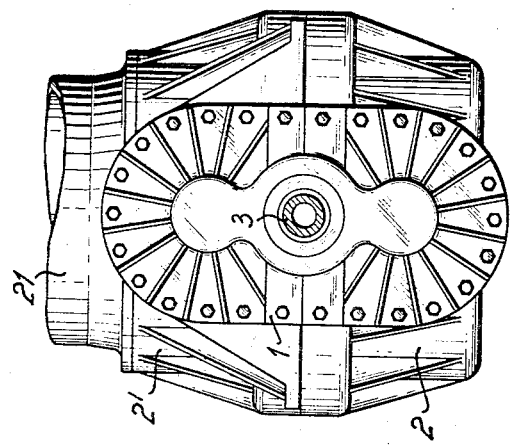
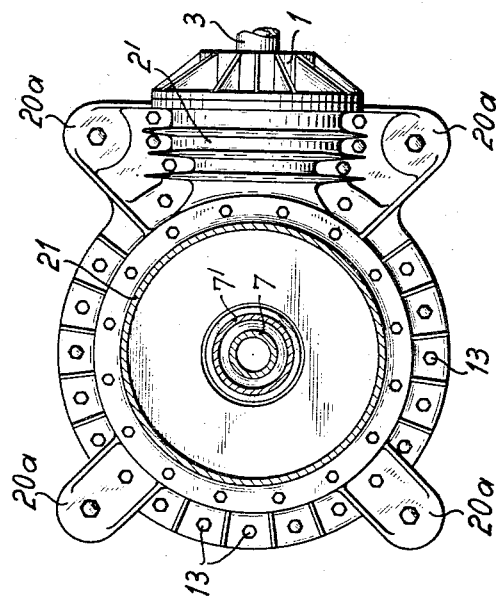
INVENTOR
Alfred Vogt
by
Michael S. Striker
Atty

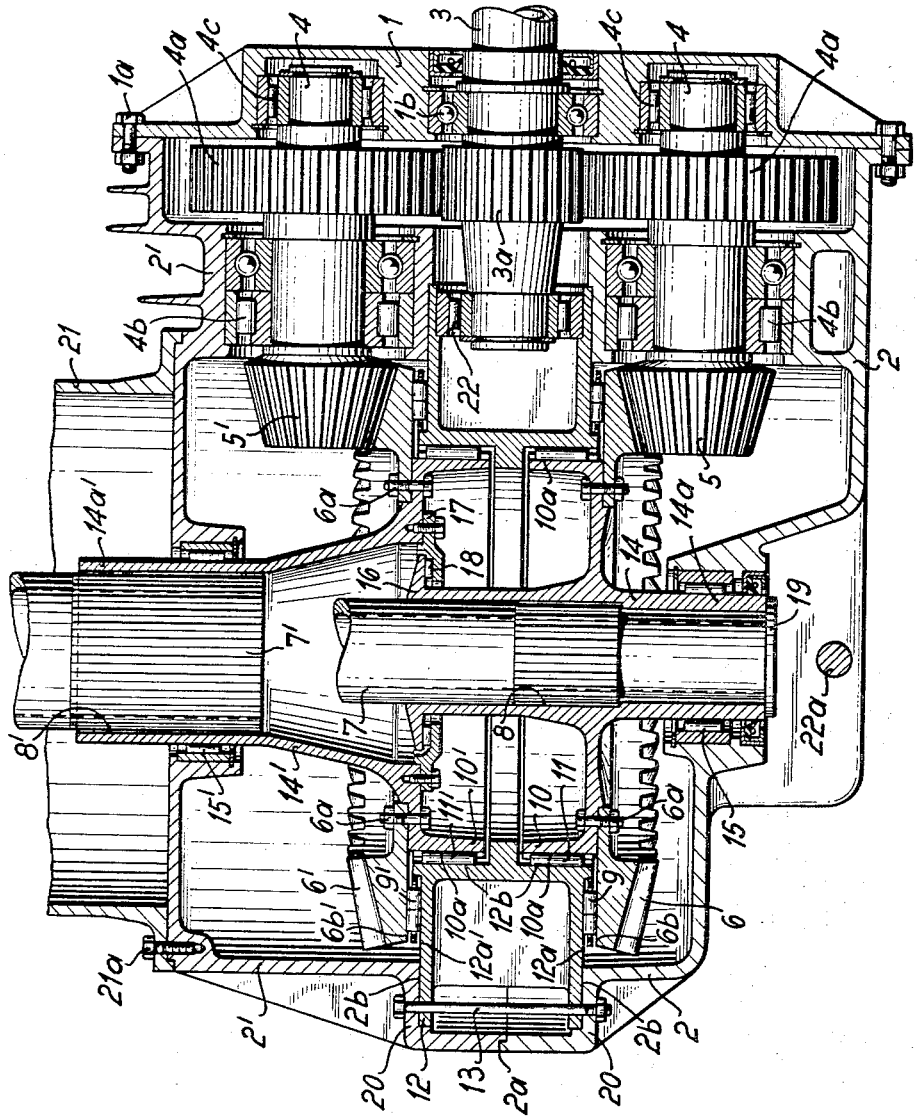

United States Patent Office 3,374,687
Patented Mar. 26, 1968

3,374,687
TRANSMISSION FOR HELICOPTER
ROTOR SHAFTS
Alfred Vogt, Friedrichshafen-Fischbach, Germany, assignor to Josef Wagner, Friedrichshafen-Fischbach, Germany
Filed Mar. 7, 1966, Ser. No. 532,274
Claims priority, application Germany, Mar. 20, 1965, W 38,810
10 Claims. (Cl. 74—417)

ABSTRACT OF THE DISCLOSURE

Two helicopter rotor shafts are secured to driven bevel gears which are supported on a bearing located between the driven bevel gears so that axial forces produced by drive bevel gear means acting on said driven bevel gears, and also by said helicopter rotor shafts are taken up by the bearing.

---

The present invention relates to a bevel gear transmission, and more particularly to a transmission for helicopter rotor shafts.

Bevel gear transmissions for helicopter rotor shafts are known in which bevel gears secured to the rotor shafts are driven by bevel pinions. Bearings are provided for the gears to take-up the axial and radial forces produced by the transmission of torque and also by the air acting on the vanes of the rotor. All forces must be counterbalanced within the transmission unit.

The shape and size of the transmission housing is substantially determined by the large diameter of the bevel gear or bevel gears by which the helicopter rotor or rotors are driven, so that it is not possible to reduce the size of the housing, and thereby the weight of the transmission.

In a known transmission for helicopter rotor shafts disclosed in the German Auslegeschrift 1,042,388, transverse walls are provided in the housing for supporting the bearings of a rotor shaft, so that the weight of the housing is further increased. Due to the position of the bearings in the central region of the housing, large dimensions are required for the bevel gears and the rotor shafts in order to take up the great forces developing between the meshing teeth of the gears. Consequently, this construction, as well as other constructions according to the prior art, are heavy which is undesirable for transmissions in helicopters.

It is one object of the invention to provide a bevel gear transmission of comparatively low weight.

It is another object of the invention to provide a bevel gear transmission for helicopter rotor shafts provided with a housing without transverse walls, and permitting the use of very light bevel gears for transmitting the required torque.

Another object of the invention is to provide a transmission for helicopter rotor shafts in which the forces produced by the rotor shafts are counterbalanced so that all parts including the housing can be small, compact, and of comparatively small weight.

With these objects in view, the present invention relates to a bevel gear transmission which is particularly suited for helicopters.

In accordance with the invention, at least one bevel gear is provided which has on one side peripheral gear teeth meshing with a bevel pinion, and is supported on the other side by an annular bearing in the proximity of the periphery thereof. The bearing may be a sliding bearing or an antifriction bearing. Since a housign wall is closely spaced from the periphery of the bevel gear, the bearing supporting the bevel gear is located also in the proximity of the housing wall and can be supported by the same, and the forces transmitted from the pinion to the peripheral teeth of the bevel gear in axial direction, can be taken up by the housing. The force transmitting parts of the bevel gear, bearing, and housing are located closely adjacent each other so that great bending moments are avoided. As a result, the bevel gear and the rotor shafts connected thereto, the bearings, and the supporting portions of the housing can be constructed to be small and light, and without consideration of bending forces.

Since not only axial forces, but also radial forces act on the bevel gear, other bearing means are provided between a cylindrical portion of the bevel gear, and an annular housing portion.

The axial force produced by the transmission of force between the bevel pinion and the bevel gear is effective only in the region where the bevel gear meshes with the pinion. Consequently, it would be sufficient to provide a bearing supporting the bevel gear only in the region of the meshing engagement of the bevel pinion. In accordance with the preferred embodiment of the invention, the bearing means supporting the bevel gear is annular and concentric with the axis of the same, and consequently adapted to take up axial forces used by the helicopter rotor shaft when lifting the helicopter, or by the mass of the helicopter shaft at the moment of landing where the inertia of the mass of the rotor shaft acts in axial direction of the same. The advantage is that the axial forces are directly transmitted from the bevel gear to the annular bearing and from the same to a supporting housing portion.

The transmission of the invention is suitable for coaxial and parallel rotor shafts, as well as for rotor shafts extending at an angle to each other. In a preferred embodiment of the invention, two coaxial rotor shafts rotating in opposite directions are connected to a pair of drive bevel gears having bevel gear teeth only on one side. It is possible to arrange the bevel gears with the gear teeth confronting each other, and to dispose the drive bevel pinion between the teeth of both bevel gears meshing with the same. With this construction, the bearing supporting the respective other sides of the bevel gears are spaced in axial direction of the rotor shaft, and supported on axially spaced housing portions. In the preferred embodiment of the invention, the toothed sides of the bevel gears face in opposite direction, and the bearing means are provided between the confronting smooth sides of the bevel gears. It is possible to provide a bearing means directly between the bevel gears so that opposing axial forces acting on the bevel gears are taken up by the intermediate bearing means. In the preferred embodiment of the invention, two bearings are provided for the two bevel gears, and are respectively supported on opposite surfaces of an annular housing portion located between the bevel gears and bearings. The annular housing portion is preferably not only used as an abutment for taking up axial forces, but also as an abutment for taking up radial forces, and other bearing means are provided between an inner annular surface of the annular housing portion, and cylindrical portions or flanges projecting from the bevel gears.

It is particularly advantageous to divide the housing into two halves which abut each other in a plane passing between the two bevel gears and bearings through the annular housing portion so that the annular housing portion can be constructed as a separate housing part secured between the two housing halves.

Since the gear teeth of the two bevel gears are located on opposite sides, two drive bevel pinions are required which are advantageously used as part of a reduction transmission which includes further gears driven from a gear on an input shaft whose axis is perpendicular to the common axis of the rotor shaft and bevel gears.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 1 is an axial sectional view illustrating an embodiment of the invention;

FIG. 2 is a plan view of the embodiment of FIG. 1; and

FIG. 3 is an elevation of the embodiment of FIG. 1.

Referring now to the drawings, a supporting housing includes two housing halves 2 and 2' having abutting faces 2a and forming shoulders 2b between which an annular housing part 12 is clamped by means of bolts and nuts 13 passing through projecting housing portions 20. A cover part 1 closes one side of the housing and is secured to the housing halves 2 and 2' by bolts and nuts 1a. A tubular housing part 21 projects upwardly from housing half 2' and is secured to the same by screws 21a.

A bearing 22 in the annular housing portion 12, and a bearing 1b in housing part 1, supports an input shaft 3 which carries a pinion 3a meshing with a pair of gears 4a on a pair of shafts 4 which carry drive bevel gears or pinions 5, 5'. Bearings 4b and 4c support shafts 4.

The first bevel gears 5, 5' mesh with second bevel gears 6, 6' of larger diameter because the axis of bevel gears 6, 6' is vertical and perpendicular to the horizontal axis of the input shaft 3. Tubular members 14 and 14' are respectively secured to the annular bevel gears 6 and 6' by bolts and nuts 6a. Each tubular member 14, 14' includes a cylindrical portion 10 and 10' coaxial with the axis of bevel gears 6, 6'. Cylindrical portions 10, 10' project toward each other from the confronting smooth planar faces of annular bevel gears 6 and 6' which have peripheral bevel gear teeth on the other opposite sides facing away from each other. Tubular members 14, 14' have other cylindrical portions 14a and 14a' respectively connected by dog couplings 8, 8' with helicopter rotor shafts 7 and 7'. Rotor shaft 7' is hollow permitting passage of rotor shaft 7 so that vane screws can be mounted on the upper ends of shafts 7, 7', not shown. Since bevel gears 5, 5' are driven in the same direction of rotation, bevel gears 6, 6' rotate in opposite directions with rotor shaft 7, 7'.

Annular housing part 12 has opposite annular support surfaces 12a and 12a', and cylindrical support surfaces 12b. Annular support surfaces 12a and 12a' are respectively located adjacent annular confronting surfaces 6b and 6b' of bevel gears 6 and 6', and cylindrical support surfaces 12b are respectively located opposite cylindrical surfaces 10a of cylindrical members 10 and 10'.

Annular bearing means 9, 9' are located between support surfaces 12a, 12a' and annular confronting faces 6b and 6b'. Annular bearing means, shown to be roller bearings 11 and 11' are respectively located between cylindrical surfaces 12b and 10a.

The cylindrical end portions 14a and 14a' of tubular members 14 and 14' are supported in bearings 15 and 15' in housing halves 2 and 2'. Bearing means 9, 9', 11, 11' and 15, 15' are all concentric with the axis of bevel gear 6, 6' and of rotor shafts 7, 7'.

An annular member 17 is secured by screws to tubular member 14 and located below a flange 16 at the upper end of tubular member 14. A roller bearing 18 between flange 16 and annular member 17 rotatably supports tubular member 14 so that the same is suspended from tubular member 14' which rests together with bevel gear 6' on the upper support surface 12a' of annular housing portion 12.

A flange 19 is provided at the lower end of rotor shaft 7 and projects over the end face of tubular member 14. When an axial force acts on shaft 7 in upward direction as viewed in FIG. 1, the force is taken up by tubular member 14 and transmitted over bevel gear 6 and bearing 9 to support surface 12a on the annular supporting portion 12.

The lifting force acting on rotor shaft 7' is taken up by a bearing in the cylindrical housing portion 21. The upwardly directed lifting force of rotor shaft 7' is consequently also transmitted to the housing, and all axial forces are transmitted by bracket 20a to the helicopter body.

If the helicopter is used for raising heavy loads, a hook or hoist can be secured to a support part 22 on the lower housing half 2 in the axis of the rotor shaft 7, 7' and located directly below the same. In such an arrangement, the lifting forces need not be transmitted through the walls of the helicopter fuselage.

A drive motor, not shown, drives input shaft 3 so that the input means 3, 3a, 4a, 4 rotate bevel gear pinions 5, 5' and thereby bevel gears, 6, 6' and rotor shafts 7, 7'. The transmission of the torque from bevel gears 5, 5' to bevel gears 6, 6' produces axial forces which are taken up by bearing means 9, 9' and transmitted to the annular housing portion 12 so that the opposing axial forces are counterbalanced. Radial forces produced by transmission of torque of bevel gears 5, 5' to bevel gears 6, 6' are taken up by bearings 11, 11' and transmitted to the annular housing portion 12.

Due to the fact that the housing is divided into two halves 2, 2', an integral annular housing portion 12 can be used, which is structurally strong and well adapted to take up all radial and axial forces.

During take off and climbing of the helicopter, substantial axial forces are transmitted by the rotor shaft 7, 7' to bevel gears 6 and 6' and taken up over bearings 9 by annular housing portion 12. When the helicopter lands, shafts 7 and 7' tend to continue the downward movement due to inertia, and the thus developed axial forces are taken up by bearing means 9' and transmitted to annular housing portion 12. Transverse forces acting on the rotor screws will produce radial forces on tubular members 14 and 14' which are transmitted by bearings 11, 11' to the inner cylindrical surface of support portion 12.

If very great input torques are required, it is possible to provide several pairs of bevel gears 5, 5' about the periphery of bevel gears 6 and 6'.

Rotor shafts 7, 7' rotate in opposite directions in the respective embodiment. However, the peripheral bearing supports of the bevel gears 6, 6' can also be used for helicopter constructions in which two rotor shafts are disposed parallel to each other, or at an angle to each other. Irrespective of the arrangement of the rotor shaft, it is possible to transmit axial forces acting on a bevel gear over bearing means located in the proximity of the periphery of the bevel gear and in the region of the teeth of the same. Since in this manner, forces acting on the teeth can be directly transmitted to the housing, the bevel gear can have small dimensions and be very light.

It will be understood that each of the elements described above or two or more together, may also find a useful application in other types of bevel gear transmissions differing from the types described above.

While the invention has been illustrated and described as embodied in a bevel gear transmission for helicopter rotor shafts in which bearing means support peripheral toothed portions of bevel gears connected to the rotor shafts, it is not intended to be limited to the details shown, since various modifictaions and structural changes may be made without departing in any way from the spirit of the present invention.

Without further analysis the foregoing will so fully reveal the gist of the present invention that others can by applying current knowledge readily adapt it for various applications without omitting features that, from the standpoint point of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Bevel gear transmission comprising, in combination, housing means; rotary input means having a first axis and including drive bevel gear means mounted on said housing means; a pair of driven bevel gears having a common second axis, a pair of opposite faces, and a pair of confronting faces, said driven bevel gears having peripheral bevel gear teeth on said opposite faces; mounting means located between said confronting faces for mounting said driven bevel gears on said housing means for rotation about said second axis, and including annular bearing means concentric with said second axis and located in the proximity of the peripheries of said driver bevel gears in a plane perpendicular to said second axis; and a pair of helicopter rotor shafts coaxial with said second axis and respectively secured to said driven bevel gears and driven by the same so that axial forces produced by said drive bevel gear means and said helicopter rotor shafts are taken up by said mounting means.

2. Bevel gear transmission according to claim 1, wherein said housing means include an annular housing part coaxial with said second axis; and having opposite annular support surfaces located in planes perpendicular to said second axis; and wherein said bearing means include a pair of bearings respectively located between said confronting faces and said annular support surfaces.

3. Bevel gear transmission according to claim 1, wherein said housing means include an annular housing part coaxial with said second axis and having a cylindrical support surface and a pair of annular support surfaces located in planes perpendicular to said second axis at the ends of said cylindrical support surface; wherein said driven bevel gears include cylindrical members projecting from said confronting faces, respectively, coaxial with said second axis; wherein said bearing means include a pair of first bearings located between said confronting faces and said annular support surfaces; and wherein said mounting means include a pair of second bearings located between said cylindrical support surface and said cylindrical members whereby axial and radical forces produced by said helicopter rotor shafts and by said drive bevel gear means are transmitted to said housing means.

4. Bevel gear transmission according to claim 3, wherein said housing means includes two housing halves abutting each other in a plane perpendicular to said second axis and located between said driven bevel gears; and wherein said annular housing part is located in said last mentioned plane and secured to said housing halves.

5. Bevel gear transmission according to claim 3, wherein said drive bevel gear means include a pair of drive bevel gears meshing with said peripheral bevel gear teeth of said driven bevel gears, respectively; and wherein said rotary input means further include a pair of shafts carrying said drive bevel gears, transmission gears on said last mentioned shafts, an input shaft, and an input gear on said input shaft meshing with said transmission gears.

6. Bevel gear transmission according to claim 5, wherein said shafts of said drive bevel gears and said rotary input shaft, are mounted in said housing means for rotation about parallel axes transverse to said second axes.

7. Bevel gear transmission according to claim 5, wherein said transmission gears have a greater diameter than said input gear; and wherein said driven bevel gears have a greater diameter than said drive bevel gears so that said helicopter rotor shafts rotate at a lower speed than said input shaft.

8. Bevel gear transmission according to claim 1, wherein said housing means include an annular housing part coaxial with said second axis and having a cylindrical support surface and a pair of annular support surfaces located in planes perpendicular to said second axis at the ends of said cylindrical support surfaces; wherein said driven bevel gears include cylindrical members projecting from said confronting faces, respectively, coaxial with said second axis; wherein said bearing means include a pair of first bearings located between said confronting faces and said annular support surfaces; wherein said mounting means include a pair of second bearings located between said cylindrical support surface and said cylindrical members whereby axial and radial forces produced by said helicopter rotor shafts and by said drive bevel gear means are transmitted to said housing means; wherein said housing means includes two housing halves abutting each other in a plane perpendicular to said second axis and located between said driven bevel gears; wherein said annular housing part is located in said last mentioned plane and secured to said housing halves; wherein said drive bevel gear means include a pair of drive bevel gears meshing with said peripheral bevel gear teeth of said driven bevel gears, respectively; and wherein said rotary input means further include a pair of shafts carrying said drive bevel gears, transmission gears on said last mentioned shafts, an input shaft, and an input gear on said input shaft meshing with said transmission gears.

9. Bevel gear transmission according to claim 1, wherein said housing means include an annular housing part coaxial with said second axis and having a cylindrical support surface and a pair of annular support surfaces located in planes perpendicular to said second axis at the ends of said cylindrical support surfaces; wherein said driven bevel gears include cylindrical members projecting from said confronting faces, respectively, coaxial with said second axis; wherein said bearing means include a pair of first bearings located between said confronting faces and said annular support surfaces; wherein said mounting means include a pair of second bearings located between said cylindrical support surface and said cylindrical members whereby axial and radial forces produced by said helicopter rotor shafts and by said drive bevel gear means are transmitted to said housing means; wherein said driven bevel gears include annular portions having said bevel gear teeth, and tubular portions fixedly surrounded by and secured to said annular portions and having cylindrical portions forming said cylindrical members and projecting toward each other, and other cylindrical portions respectively projecting from said opposite faces of said driven bevel gears and connected with said helicopter rotor shafts for rotary movement, one of said helicopter rotor shafts being hollow, and the other helicopter rotor shaft passing through said hollow shaft.

10. Bevel gear transmission according to claim 9 and including bearings on said housing means rotatably supporting said other cylindrical portions of said tubular portions of said driven bevel gears.

References Cited

UNITED STATES PATENTS

| | | | |
|---|---|---|---|
| 1,449,353 | 3/1923 | Seniw | 74—417 X |
| 2,019,739 | 11/1935 | Spalding | 74—417 X |
| 3,012,441 | 12/1961 | Lamb et al. | 74—417 X |
| 3,034,371 | 5/1962 | Cantalupo et al. | 74—423 |

DONLEY J. STOCKING, Primary Examiner.

LEONARD H. GERIN, Examiner.